United States Patent [19]
Price

[11] Patent Number: 5,991,335
[45] Date of Patent: *Nov. 23, 1999

[54] METHOD AND SYSTEM FOR LINE ISOLATION

[75] Inventor: Tim Urry Price, Salt Lake City, Utah

[73] Assignee: 3Com Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/950,217

[22] Filed: Oct. 14, 1997

[51] Int. Cl.⁶ .................................................. H04B 1/38
[52] U.S. Cl. ........................... 375/219; 375/220; 359/152
[58] Field of Search ..................... 375/219, 220, 375/257, 238, 259; 359/152, 153, 163, 184, 186, 118, 167; 250/551

[56] References Cited

U.S. PATENT DOCUMENTS

| | | | |
|---|---|---|---|
| 5,146,357 | 9/1992 | Epstein | 359/152 |
| 5,245,645 | 9/1993 | Wilkison et al. | 379/405 |
| 5,287,107 | 2/1994 | Gampell et al. | 341/137 |
| 5,406,091 | 4/1995 | Burba et al. | 250/551 |
| 5,465,298 | 11/1995 | Wilkison et al. | 379/406 |
| 5,473,552 | 12/1995 | Chen et al. | 364/514 |
| 5,499,047 | 3/1996 | Terry et al. | 348/6 |
| 5,509,126 | 4/1996 | Oprescu et al. | 395/307 |
| 5,517,489 | 5/1996 | Ogura | 370/161.1 |
| 5,526,154 | 6/1996 | Pyhalammi | 359/125 |
| 5,535,035 | 7/1996 | DeFoster et al. | 359/16.1 |
| 5,576,941 | 11/1996 | Nguyen et al. | 363/21 |
| 5,608,447 | 3/1997 | Farry et al. | 348/7 |
| 5,636,109 | 6/1997 | Carroll | 363/21 |
| 5,663,819 | 9/1997 | Lewis | 359/118 |
| 5,697,047 | 12/1997 | Nicholson | 455/5.1 |

*Primary Examiner*—Chi H. Pham
*Assistant Examiner*—Emmanuel Bayard
*Attorney, Agent, or Firm*—Workman, Nydegger & Seeley

[57] ABSTRACT

A method and apparatus for transceiving data across an isolation boundary in a communication network between a user device on a user side of the isolation boundary and a line-side associated with a communication network such as a telephone network. Transmit data on the user side and receive data on the line-side are pulse modulated using known techniques such as pulse position and pulsewidth modulation methods. The resultant pulse modulated data streams then digitally traverse the isolation boundary via an isolation device such as an optocoupler. Upon completion of the traversal of the isolation boundary, the traversed pulse modulated data is integrated to form an approximation of the original transmit and receive data, respectively, without added distortion from a traversal of the isolation boundary by analog data.

24 Claims, 4 Drawing Sheets

METHOD AND SYSTEM FOR LINE ISOLATION

BACKGROUND OF THE INVENTION

1. The Field of the Invention

This invention relates generally to line isolation of electronic circuitry. More particularly, this invention relates to isolation circuitry for use in interfacing user equipment with telephonic or other networks.

2. Present State of the Art

Traditional custom equipment that interfaces with custom networks or systems may employ a variety of interface standards. However, interface devices such as end user equipment that interfaces with established networks, such as the telephone network, are required to employ an established interfacing standard. One such standard requires end user equipment to provide electrical isolation between user equipment and the telephone network. Such isolation requirements stem from regulatory agencies such as the Federal Communications Commission and other counterpart regulatory agencies in other countries. A fundamental purpose for such regulations is to provide safety and protection to the established telephone network. Such protection prevents end user equipment from accidentally injecting or accepting into the protecting network and the user/consumer telephone network extraneous or hazardous signals.

While specific regulations and requirements may vary from country to country, established circuits which facilitate the isolation requirements of most regulatory agencies have become commonplace. One such circuit component is a Direct Access Arrangement (DAA). As shown in FIG. 1, DAA 112 provides the most proximate interface of user equipment with a telephone network 104. As an exemplary configuration of user equipment, FIG. 1 illustrates a host 100 which may take the form of a personal computer or other interfacing equipment. As many types of end user equipment generate digital data, a modem 102 is required to modulate and demodulate digitized data into an analog format capable of propagation through telephone network 104. An exemplary modem 102 is further comprised of a host interface 106 generally taking the form of an ASIC integrated circuit or other programmable or discrete circuitry for compatible exchange of data with host 100. Most modern digital signal processors (DSP) such as DSP 108 provide, among other things, the functionality required for modulating and demodulating digital data. A CODEC 110 provides a transformation between digital data and analog data for data transmitted from host 100 and translation of analog data to digital data for data dispatched by telephone network 104 to host 100. The functionality and composition of host interface 106, DSP 108, and CODEC 110 are generally known in the art and need not be further discussed.

As data generated by host 100 and destined for telephone network 104 must exit the end user equipment and travel on the telephone network, the illustrative modem 102 must incorporate the isolation requirements as dictated by regulatory agencies. In the present illustration of FIG. 1, DAA 112 provides the isolation requirements for protecting telephone network 104 from extraneous and injurious signals. To prevent such extraneous and injurious signals from passing from host 100 to telephone network or to endanger the uswer 104, an isolation boundary 202 is established wherein the signals generated by user equipment 100 must be coupled across isolation boundary 202 to telephone network 104.

In FIG. 2, a traditional DAA 200 is depicted as implementing the required isolation boundary 202. As described above, isolation boundary 202 forms a partition between a user side connected to a host, such as a personal computer, and a line-side connected to the network, such as a telephone network. Traditional DAA implementations have incorporated on the user side a user side signal interface 204 to provide access to transmit and receive signals coupled to a hybrid circuit 216 which, due to the combining of transmit and receive signals on the line-side, requires that the transmit signal be cancelled or removed from the receive signal.

Isolation boundary 202 is then established across a transformer 208 which provides the required coupling between the user side and the line-side. Because of the inherent nature in transformer coupling, the user side and the line-side may float with respect to a potential across isolation boundary 202. Traditional implementations of the line-side circuitry in DAA 200 include bypass capacitors 210, a hold circuit 212, and a diode bridge 214 for generating tip and ring signals 206 characteristic of a telephone network. Hold circuit 212, among other things, incorporates an off hook switch for providing the DC current path necessary to notify a telephone network of an off-hook condition and a ring detector for notifying a user of an incoming communication. Other isolation boundary implementations include capacitively coupling the analog transmit and receive signals across the isolation barrier by providing a pair or pairs of capacitors that differentially couple analog transmit and receive signals from a user side across the isolation barrier to a line-side.

While modem isolation implementations of the past have generally been transformer based, there have also been other methods such as linear optical solutions that use an active region of an optical isolator for transfer of analog signals across the isolation boundary. While transformer designs were feasible for physically larger designs, transformer designs incorporated into smaller integrated products compromise the linearity and also generate insertion loss and a degraded frequency response as transformers are reduced in physical size. Linear optical approaches are also feasible, but require gain adjustments and tuning for variations in gains associated with optical isolator production runs. Furthermore, linear optical isolators are more expensive than standard optocouplers.

Thus, what is needed is a method and system for providing an isolation boundary between a user side and a line-side for equipments interfacing with a defined network, such as a telephone network, that require an isolation boundary. Furthermore, what is desired is a method and system for providing an isolation boundary utilizing isolation components that lend themselves to economical integrated designs without subjecting themselves to the degraded affects associated with miniaturized magnetic components.

SUMMARY AND OBJECTS OF THE INVENTION

It is an object of the present invention to provide a method for transceiving data across an isolation boundary in a communication network between a user device on a user side of an isolation boundary and a communication network on a line-side of the isolation boundary.

Another object of the present invention is to provide a method for digitally crossing an isolation boundary in a communication network thereby minimizing distortion associated with traversal of the isolation boundary.

A still further object of the present invention is to provide a method for optically coupling digital data across the isolation boundary to minimize coupling between a user side and line-side of the communication network.

Yet another object of the present invention is to provide a data access arrangement (DAA) for digitally transmitting data across an isolation boundary separating a first side such as a user side and a second side such as a line-side.

A still further object of the present invention is to provide an isolation circuit for pulse modulating data for digital transmission across an isolation boundary in a communication network.

A yet further object of the present invention is to provide an isolation circuit for transceiving data between a user side and a line-side across an isolation boundary in a communication network by digitally conveying data via an optocoupler operating in the saturation region.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. To achieve the foregoing objects, and in accordance with the invention as embodied and broadly described herein, a method and system for transceiving data across an isolation boundary between a user device on a user side of the isolation boundary and a line-side associated with a communication network is provided.

An isolation circuit provides an isolation boundary between a user device on a user side of the isolation boundary and a line-side associated with the communication network, such as a telephone network. The isolation circuit may be incorporated within a DAA or may comprise the entire DAA. Additionally, the DAA or isolation circuit may be further incorporated within a modem or other traditional information transformation device. A DAA may also be supported external to a modem such as when located intermediate between user equipment such as a computer and network equipment such as a telephone.

An isolation boundary partitions the isolation circuit into a user portion and a line-side portion. A user side portion interfaces with user equipment and receives transmit data for coupling across the isolation boundary and for delivery to a communication network such as a telephone network. The user side portion of the isolation circuit also receives coupled or combined data and separates the receive data for delivery to user equipment. The transmit data is received at a transmit pulse modulator located prior to the isolation boundary and pulse modulates the transmit data.

In the preferred embodiment of the present invention, pulse position modulation is employed by the pulse modulators. Pulse position modulation utilizes a constant pulse-width and varies the frequency of the constant width pulses with the modulated analog signal. Other pulse modulation techniques may also be implemented in the present invention to form other alternate embodiments included within the scope of the present invention. In the preferred embodiment, the pulse modulator is implemented from a counter and other discrete components.

The isolation circuit is further comprised of an optocoupler for isolating an input signal from an output signal thereby forming the isolation boundary. While the present invention may employ linear optocouplers, that is to say optocouplers capable of operation in the linear region, the present invention may also utilize optocouplers operating in the saturation region due to the digital nature of the transfer of information across the isolation boundary. Therefore, less expensive optocouplers operating in the saturation region rather than linear couplers employing a plurality of photo-diodes wherein at least one photodiode monitors the linearity of the optical coupling may be employed.

The output of the optocoupler provides an isolated pulse stream to a hold circuit comprised of a transmit integrator or line-side integrator to approximate the analog signal of the transmit data as reconstructed from the pulse modulated transmit data. The line-side integrator also couples to a hybrid circuit to separate the transmit and receive signals from their combined state into their component parts by removing the transmit signal from the combined signal to present a receive only signal to a receive pulse modulator. The isolation circuit is further comprised of a diode bridge for providing a reversible interconnection polarity for the tip and ring signals of the communication network.

Now turning to the receive portion of the isolation circuit, a pulse modulator receives the analog receive data and performs pulse modulation techniques to form a pulse stream carrying the corresponding receive data information. The receive pulse modulator may be implemented similar to the transmit pulse modulator as discussed above. The pulse modulated receive data as modulated by the receive pulse modulator is received at the receive optocoupler for coupling across the isolation boundary. The receive optocoupler provides coupling between a light emitting diode an optically coupled photodiode, as disclosed above.

The receive optocoupler couples to a receive or user side integrator to reconstruct an approximation of the receive data as originated from the computer network as line-side receive data. As described above for the line-side integrator, the user side integrator may be implemented, among other ways, as a low pass op amp filter or an RC network to form the receive data on the user side for presentation to the user equipment.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
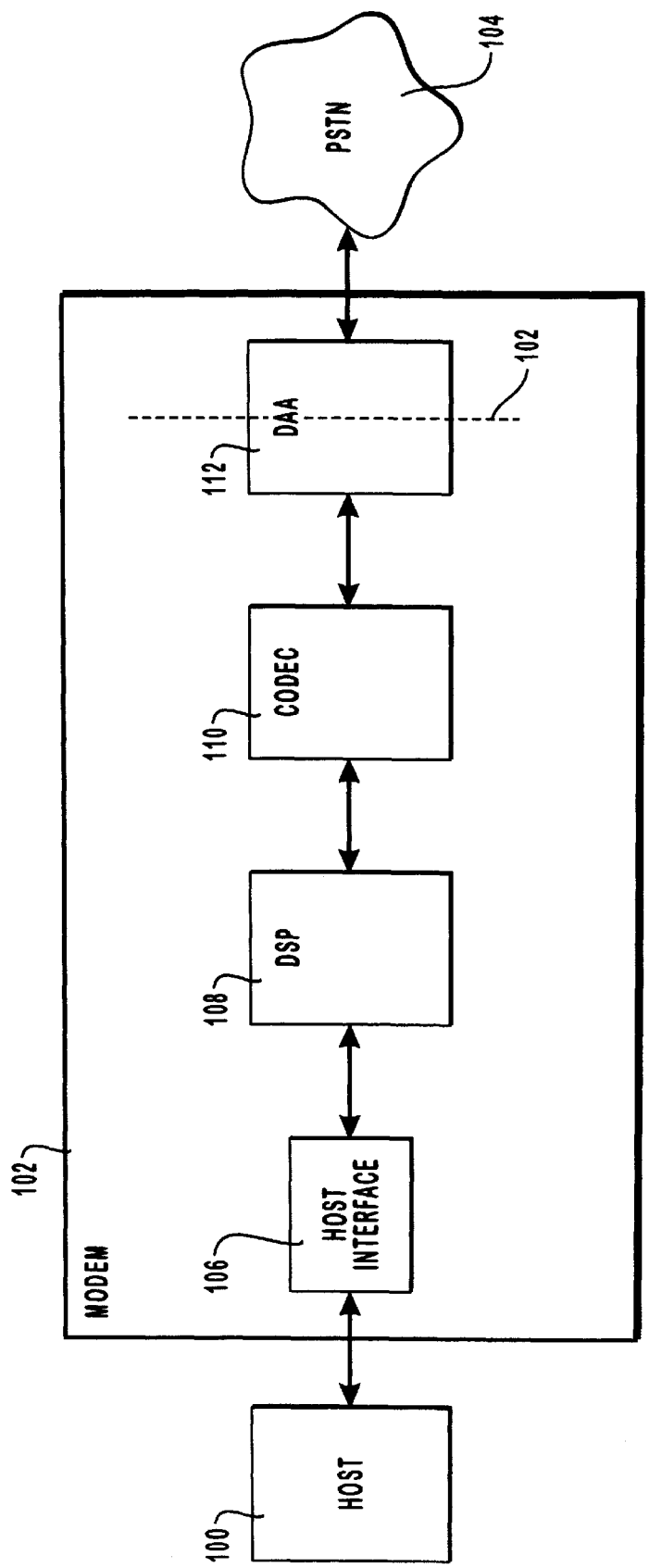
FIG. 1 is a simplified block diagram of a traditional interconnection of user equipment with an established network.
Figure 2:
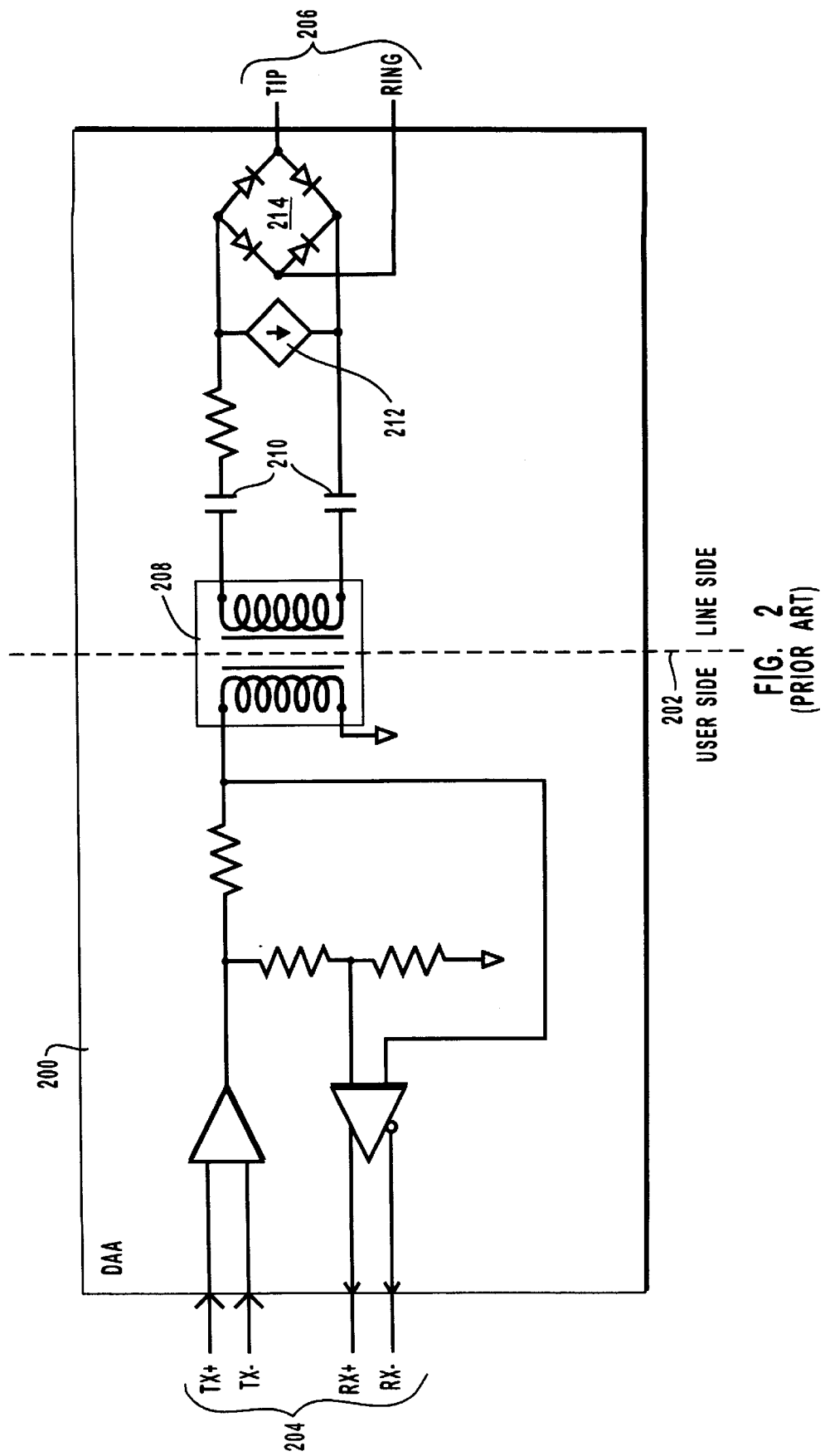
FIG. 2 is a circuit diagram of prior art implementations of a direct access arrangement (DAA) implementing an isolation boundary through transformer coupling techniques.

The present invention embodies within its scope both methods and systems for electrically isolating user equipment from network equipment, such as a telephone network, as may be required by regulatory requirements. As described in FIG. 1, safety and other concerns dictate that user equipment interfacing with an established network, such as a telephone network, must provide electrical isolation between the electrical levels associated with user equipment and the electrical levels associated with network equipment. Such isolation forms an isolation boundary which requires that signals passing across the boundary be coupled in some form across the isolation boundary as opposed to passing directly through the isolation boundary. In the present invention, the isolation circuitry may be incorporated within a DAA as functionally configured and illustrated in FIG. 1. That is to say, in a configuration incorporating a host, such as a personal computer, with a network, such as a telephone network, modem functionality is employed for bridging the traditional digital domain of user equipment with the analog domain of traditional telephony. The present invention may be incorporated within the modem functionality or may be independently incorporated between the modem functionality and the network interface. In either embodiment, the isolation circuit of the present invention receives analog signals, traverses the isolation boundary and recreates an approximation of the analog signals as received.

Figure 3:
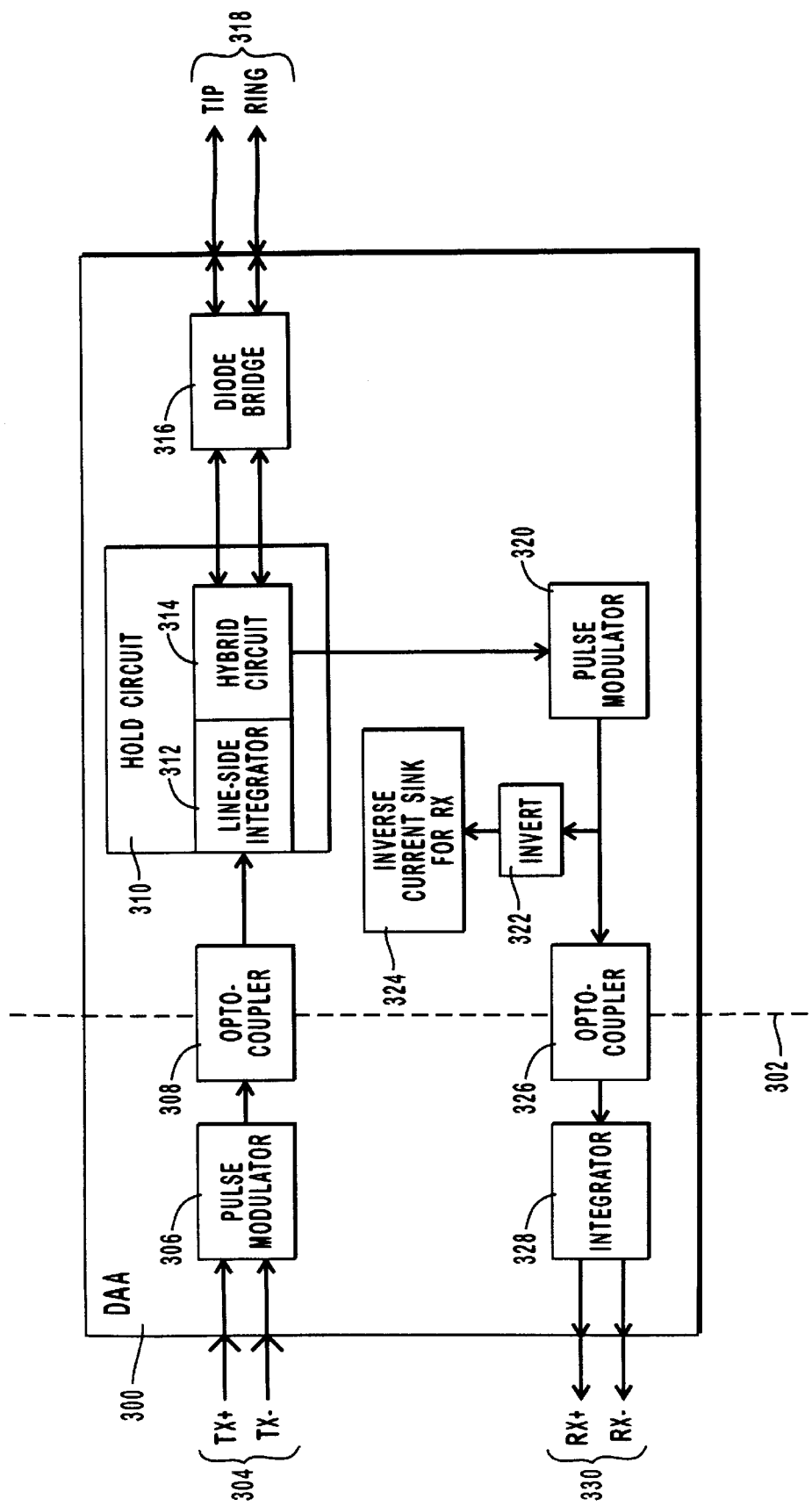
FIG. 3 is a simplified block diagram of a method and system for electrically isolating user equipment from a network system, in accordance with a preferred embodiment of the present invention.

FIG. 3 depicts an isolation circuit for providing the isolation boundary between a user device on a user side of the isolation boundary and a line-side associated with the communication network, such as a telephone network, in accordance with the preferred embodiment of the present invention. As depicted in FIG. 3, the isolation circuit is incorporated within a DAA 300 wherein DAA 300 may be incorporated within a modem or other traditional information transformation device or DAA 300 may be external to modem functionality but intermediate to user equipment such as a computer and network equipment such as a telephone.

Referring to FIG. 3, an isolation boundary 302 partitions the isolation circuit into a user portion and a line-side portion. A user side portion interfaces with s user equipment and receives transmit data 304 for coupling across isolation boundary 302 for delivery to a communication network such as a telephone network. The user side portion of the isolation circuit also receives coupled data and generates receive data 330 for delivery to user equipment. In the present invention, transmit data 304 is received at a pulse modulator 306 for processing prior to coupling across isolation boundary 302. Pulse modulator 306 pulse modulates transmit data 304 to form pulse modulated transmit data. Pulse modulation is a signal processing technique wherein an analog wave form may be partitioned into a series of digital pulses or a pulse train representative of an approximation of the original analog signal. In an alternate embodiment, pulse modulation takes the form of pulsewidth modulation wherein a series of pulses of variable width and constant amplitude may be used to regenerate a synthesized wave form. Pulsewidth modulation employs a constant pulse period while generating a varying width of the pulse. That is to say, the width of the pulse or the energy under the pulse generally tracks the analog signal being modulated by increasing the pulsewidth as the analog signal increases in amplitude.

The preferred embodiment of the present invention employs pulse position modulation techniques within pulse modulator 306. Pulse position modulation employs a constant pulsewidth, however, the frequency of the constant width pulses varies with the modulated analog signal. That is to say, analog signals having a higher amplitude are modulated using pulse position modulation techniques by incorporating an additional number of pulses resulting from a reduction of the spacing between successive pulses thus incorporating the analog information. Pulse position modulation techniques allow a common clock frequency to be employed while varying only the number of pulses transmitted. Other pulse modulation techniques may also be implemented in the present invention to form other alternate embodiments included within the scope of the present invention. Pulse modulator 306 may be implemented as a digital signal processor or other discreet components, such as an op amp and counter, or other implementations known by those of skill in the art. Furthermore, since pulse modulator 306 is incorporated on the user side, pulse modulator 306 may be implemented using a portion of the user equipment signal processing capabilities, or signal processing capabilities resident within a modem.

The isolation circuit of the present invention is further comprised of an optocoupler 308 for isolating an input signal from an output signal thereby implementing isolation boundary 302. Optocoupler 308 generally consists of a light emitting diode (LED) generally of the form of an IRLED optically coupled to a photodiode responsive to light emitted by the IRLED. The photodiode is generally proportionally responsive to a proportional amount of photo currents induced by the IRLED. While the present invention may employ linear optocouplers, that is to say optocouplers operating in the linear region, the present invention also allows optocouplers to operate in the saturation region because of the digital nature of the transfer of information across the isolation boundary. That is to say, in the present invention information is transferred across the isolation boundary in digital form (e.g., a series of pulses) rather than in linear format. Therefore, less expensive optocouplers operating in the saturation region rather than linear couplers employing a plurality of photodiodes wherein at least one photodiode monitors the linearity of the optical coupling may be employed.

The output of optocoupler 308 provides to a hold circuit 310 the isolated pulse stream as originated by pulse modulator 306. Hold circuit 310 is comprised of a transmit integrator or line-side integrator 312, a hybrid circuit 314 and other functional elements not shown such as a ring detector and off-hook switch. Line-side integrator 312 may alternatively precede or be located outside the bounds of hold circuit 310, or as shown FIG. 3, be incorporated within the integrated circuitry of hold circuit 310. Line-side integrator 312 responds to the pulse train generated by pulse modulator 306 and may be implemented as an op amp having a low pass filter configuration or as an RC network, although an RC network configuration generally is not as effective in filtering out the high frequency pulse resulting in noise aliasing down into the audio band of interest. Line-side integrator 312 functions to approximate the analog signal of transmit data 304 as reconstructed from the pulse modulated transmit data.

Line-side integrator 312 couples to a hybrid circuit 314. While additional functionality may be incorporated within hybrid circuit 314, the primary role performed by hybrid circuit 314 is to separate the transmit and receive signals from their combined state into their component parts. Hybrid circuit 314 removes the transmit signal from the combined signal to present a receive only signal to a pulse modulator 320. The preferred embodiment for the isolation circuit, including hold circuit 310, is detailed in FIG. 4.

A diode bridge 316 interfaces with hold circuit 310 for providing a reversible interconnection polarity for tip and ring signals 318 interfacing with the communication network. The specific implementation of a diode bridge is not further detailed as specific implementations are know by those of skill in the art.

Referring now to the receive signal as separated by hybrid circuit 314, a receive pulse modulator 320 receives the analog receive data. Pulse modulator 320 performs pulse modulation techniques upon the receive data to form a pulse stream carrying the corresponding data information. Pulse modulator 320 may be implemented similar to pulse modulator 306 as discussed above either by discreet components, such as op amps and counters, digital signal processor, or other techniques known by those of skill in the art. As discussed above, pulse modulator 320 may employ pulse-width modulation techniques wherein variations in the width of the pulses contain the information to be modulated, or alternatively, pulse position modulation techniques may be employed wherein the width of the individual pulses remains constant while the frequency of the pulses is increased or decreased to encode the signal information. Alternatively, other pulse modulation techniques known by those of skill in the art may be employed to achieve similar results.

It should be noted that in the present invention the line-side portion of the isolation circuit is powered by the loop current provided by the communication network. That is to say, the power associated with tip and ring signals 318 is tapped or utilized for powering the line-side portion of the isolation circuit. Those skilled in the art will appreciate that pulse modulator 320 receives as an input signal a generally smooth continuous analog signal. However, in the process of translating the receive analog signal into a pulse stream, pulse modulator 320 generates a pulse train having very high slew rate pulses. Such high slew rate pulses inject high frequency components or ripple onto the supply line powering the line-side circuitry. As discussed immediately above, the supply line powering the line-side circuitry is generated from the tip and ring signals 318 of the communication network. Therefore, without any additional conditioning of the circuitry supply lines derived from tip and ring signals 318, contamination of the tip and ring signals, and hence the communication network would result. The present invention contemplates such contamination signals and conditions the supply lines by incorporating an inversion 322 for providing a phase inversion of the pulse train for driving an inverse current sync 324. Inverse current sink 324 provides a complementary current sink for conditioning the supply lines thereby mitigating the effect upon the tip and ring signals of the communication network. Inversion 322 and inverse current sink 324 may be implemented as a transistor in opposite phase with the pulse train as generated by pulse modulator 320.

The pulse modulated receive data as modulated by pulse modulator 320 is received at optocoupler 326 for coupling across isolation boundary 302. Optocoupler 326 performs similarly to optocoupler 308 by providing coupling between a light emitting diode and an optically coupled photodiode. As disclosed above, optocoupler 326 need not operate in a linear region as required by prior art configurations of optocouplers. In the present invention, optocoupler 326 may operate in the saturation region due to the digital transmission of information across the optically coupled device. Because of this digital employment of an optocoupler, less expensive optocouplers may be employed as linearity need not be monitored or compensated.

Optocoupler 326 couples to a receive or user side integrator 328. Integrator 328 receives the pulse modulated receive data as optically coupled by optocoupler 326 to reconstruct an approximation of receive data as originated from the computer network as line-side receive data. As described above for line-side integrator 312, user side integrator 328 may be implemented, among other ways, as a low pass op amp filter or an RC network to form receive data 330 for presentation to user equipment.

Figure 4:
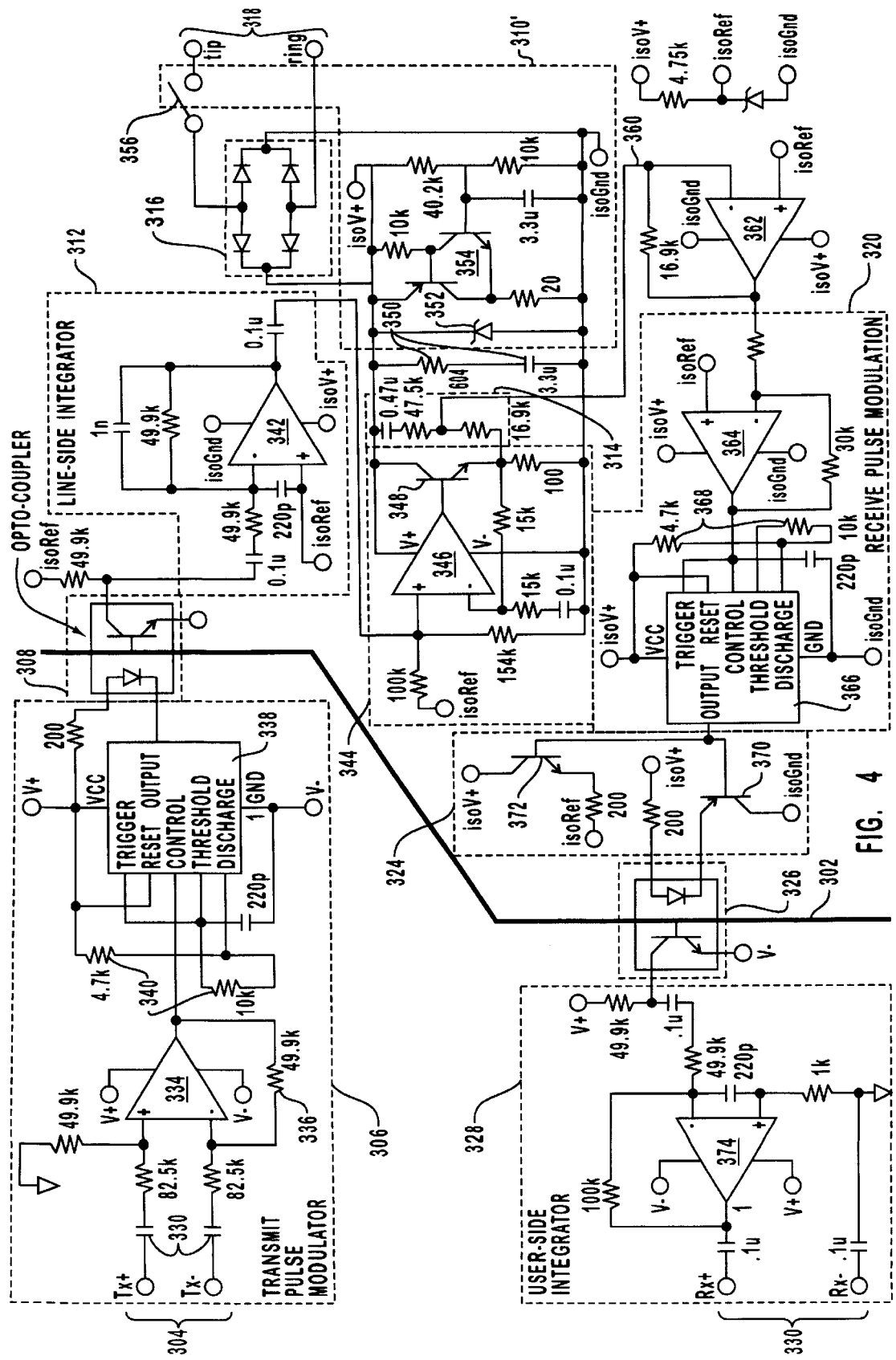
FIG. 4 is a schematic diagram of a isolation circuit for pulling pulse modulation techniques while crossing the isolation down, in accordance with the preferred embodiment of the present invention.

FIG. 4 is a schematic diagram of the isolation circuit for pulse modulating data information across the isolation boundary, in accordance with the preferred embodiment of the present invention. As discussed above, isolation boundary 302 provides a partioning of user side functionality from the line-side functionality. Transmit data 304, is presented to a pulse modulator 306, herein shown as a pulse position modulator in accordance with the preferred embodiment. Transmit data 304 traverses bypass capacitors 332 for removal of the DC component of transmit data. Op amp 334 is further biased using a representative biasing network as shown. The biasing of op amp 334, as shown, transforms the differential transmit data input signals into a single-ended signal for additional processing. Resistor 336 provides feedback for setting the transmit gain of op amp 334. Therefore, op amp 334 provides a dual end to single end converter.

A counter 338, such as a 555 known by those of skill in the art, is driven by the single-ended transmit data signal to generate a pulse train comprised of pulse position modulated transmit data. A pulse position implementation of pulse modulator 306 provides a more simplified, and hence less expensive, implementation of a pulse modulator. It should be reiterated, however, that other pulse modulation techniques, such as pulsewidth modulation techniques, are considered to be within the scope of the present invention. Counter 338 provides a pulse generator wherein the density of the pulses is increased or decreased according to the transmit data to be pulse modulated. That is to say, for rising levels of transmit data, the pulse density on the output of counter 338 increases while the pulse density of pulses on the output for decreasing transmit data signals decreases according to a decreasing input transmit data signal. It should be reiterated that according to pulse position modulation techniques, the pulsewidth of the pulses remains constant while the density of the pulses changes as the input transmit data signal varies. Resistors 340 provide the bias for counter 338, that is to say, resistors 340 define the base frequency of operation by counter 338.

The output of counter 338 carries the pulse position modulated transmit data to optocoupler 308 for traversal of isolation boundary 302. Optocoupler 308 may be comprised of a typical optocoupler known by those of skill in the art. It should be reiterated that optocoupler 308 need not be operated in the linear region and therefore does not require optocoupler 308 to be comprised of dual photoreceptors for linearity monitoring. In the preferred embodiment, optocoupler 308 is comprised of a single, light emitting diode (LED) and a single photoreceptor optically coupled to the LED.

In FIG. 3, the optically coupled pulse modulated transmit data signal is shown feeding into pulse circuit 310 comprised of line-side integrator 312 and 314, however, in FIG. 4 the circuitry for line-side integrator 312, hybrid circuit 314 and miscellaneous hold circuitry 310' are shown as distinct portions of the isolation circuit for clarity. Returning to FIG. 4, the optically coupled modulated transmit data is processed by a line-side integrator 312 to transform the digitally modulated signal back to an analog signal. Line-side integrator 312 is comprised of an op amp 342 and miscellaneous capacitors and resistors for generating a low pass filter or integrator.

A transmit current driver 344 receives the integrated transmit data signal and provides the drive necessary for driving tip and ring signals via diode bridge 316. In the preferred embodiment, transmit current driver 344 is comprised of an op amp 346 and a transistor 348 for providing the necessary drive levels required by tip and ring signals 318. Transmit current driver 344 further couples to hybrid circuit 314, which in the present invention, is located on the line-side of the isolation circuit as opposed to many prior art configurations that incorporate the hybrid circuit on the user side portion of the isolation circuit. Hybrid circuit 314 isolates the line-side receive data from the combined transmit and receive signal by removing the transmit portion from the combined signal. Additionally, series resistor and capacitor 350 provides an AC termination to terminate the tip and ring signal to the standard termination values, which in this embodiment approximates 600 ohms, in accordance with United States telephony standards.

The independent detailed functionality of hold circuit 310 (FIG. 3) is illustrated in FIG. 4 as hold circuit 310'. Zener diode 352 provides an inductive circuit thereby allowing the AC components to be exhibited across iso V+ an isoGnd. Hold circuit 310' is further comprised of a complementary Darlington pair 354, which in the present configuration, assists in the elimination of the transconductance of each transistor. When a relay 356 is closed resulting from an off-hook condition, such as occurs when placing or answering a call, complementary Darlington pair 354 draws current between tip and ring 318 thereby notifying the telephone company's central office of an off-hooked condition.

Line-side data receive signal 360 as separated by hybrid circuit 314, is processed through the line-side receive portion of the circuitry. An op amp 362, although not entirely necessary for the present configuration, provides additional signal drive for pulse modulator 320 thereby reducing loading of hybrid circuit 314. Op amp 362 is shown in the present circuit primarily because op amps traditionally are packaged in pairs, and therefore op amp 262 may be tied-off as a spare or incorporated into the isolation circuit as shown to provide incremental improvement to the overall circuit.

Receive pulse modulator 320 is configured as a pulse position modulator, in accordance with the preferred embodiment. It is reiterated, however, that receive pulse modulator 320 may take other forms such as pulse with modulators or other pulse modulation techniques known by those of skill in the art. Receive pulse modulator 320 is comprised of an op amp 364 for providing the required drive levels necessary for driving counter 366. Counter 366 performs similarly to the operation of transmit counter 338 by increasing the density of the pulses generated in response to an increasing line-side receive data signal level and reducing the density of pulses generated corresponding to a reduction in the line-side receive signal. Resistors 368 provide the biasing for counter 366 corresponding with the biasing set by resistors 340 for the transmit pulse modulator.

The pulse modulated receive data signal passes through inverse current sink 324 wherein transistor 370 drives optocoupler 326 for optically traversing isolation boundary 302. Optocoupler 326 is comprised of an LED and a photoreceptor consistent with the description of transmit optocoupler 308 described above. Inverse current sink 324 further provides a transistor 372 which operates at 180° out of phase with transistor 370. By operating out of phase with the modulator receive data transistor 370, a more consistent current drive level is exhibited on the line-side current draw from tip and ring signals 318. In the absence of out of phase transistor 372, receive data signals echo back on tip and ring signals 318 through the central office equipment. Such echoes would be interpreted by the central office as transmit signal data resulting in a perceived echo or distortion of the receive data at the remote party.

The pulse modulated receive data, as digitally coupled through the optocoupler, is then returned to analog form via receive or user side integrator 328. Receive integrator 328, like line-side integrator 312, is comprised of a low pass filter, implemented, in the preferred embodiment, using an op amp 374 to generate receive data 330.

While the preferred embodiment has been illustrated in FIG. 4 as a pulse position modulation isolation circuit, such as that incorporated within a DAA, other modulation techniques, particularly pulsewidth modulation may be incorporated into alternate embodiments thereby providing the same functionality of digitally traversing the isolation boundary by incorporating a digital coupler such as an optocoupler for traversing the isolation boundary.

The present invention may be embodied in other specific forms without departing from the spirit or essential characteristics. The described embodiments are to be considered in all respect only illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a data access arrangement, a method for transceiving data across an isolation boundary between a user device on a user side of said isolation boundary and a line-side associated with a communication network, said method comprising the steps of:
   a) pulse modulating, on said user side, transmit data originating on said user side in an analog waveform into pulse modulated transmit data;
   b) digitally coupling said pulse modulated transmit data across said isolation boundary to said line-side;
   c) integrating said pulse modulated transmit data on said line-side to form line-side transmit data as an approximation in analog form of said transmit data;
   d) pulse modulating, on said line-side, receive data originating on said line-side in an analog waveform into pulse modulated receive data;
   e) digitally coupling said pulse modulated receive data across said isolation boundary to said user side; and
   f) integrating said pulse modulated receive data on said user side to form user side receive data as an approximation in analog form of said receive data.

2. The method as recited in claim 1, wherein said pulse modulating steps are performed using pulsewidth modulation techniques.

3. The method as recited in claim 1, wherein said pulse modulating steps are performed using pulse position modulation techniques.

4. The method as recited in claim 1, wherein said communication network is comprised of a telephone network.

5. The method as recited in claim 1, wherein said digitally coupling said pulse modulated transmit data across said isolation boundary step comprises the step of optically coupling said pulse modulated transmit data across said isolation boundary using an optocoupler.

6. The method as recited in claim 5, wherein said optocoupler saturates for transferring said pulse modulated transmit data when activated.

7. The method as recited in claim 1, wherein said integrating step further comprises the step separating line-side transmit data and line-side receive data on said line-side from a combined signal.

8. In a data access arrangement, a method for transmitting data across an isolation boundary separating a first side and a second side, said method comprising the steps of:
   a) pulse modulating, on said first side, transmit data originating on said first side in an analog waveform into pulse modulated transmit data;
   b) digitally coupling said pulse modulated transmit data across said isolation boundary to said second side; and
   c) integrating said pulse modulated transmit data on said second side to form second side transmit data as an approximation in analog form of said transmit data.

9. The method as recited in claim 8, wherein said pulse modulating step is performed using pulsewidth modulation techniques.

10. The method as recited in claim 8, wherein said pulse modulating step is performed using pulse position modulation techniques.

11. The method as recited in claim 8, wherein said digitally coupling said pulse modulated transmit data across said isolation boundary step comprises the step of optically coupling said pulse modulated transmit data across said isolation boundary using an optocoupler.

12. The method as recited in claim 11, wherein said optocoupler saturates for transferring said pulse modulated transmit data when activated.

13. An isolation circuit in a data access arrangement for transceiving data across an isolation boundary between a user device on a user side of said isolation boundary and a line-side associated with a communication network, comprising:
   a) a transmit pulse modulator on said user side to receive user side transmit data for pulse modulating transmit data having an analog waveform;
   b) a transmit digital coupler having a user side and a line-side, said user side operably coupled to said transmit pulse modulator to receive pulse modulated transmit data and couple said pulse modulated transmit data across said isolation boundary;
   c) a transmit integrator coupled to said line-side of said transmit digital coupler to generate an approximation in analog form of said user side transmit data;
   d) a receive pulse modulator on said line-side to receive line-side receive data for pulse modulating receive data having an analog waveform;
   e) a receive digital coupler having a line-side and a user side, said line-side operably coupled to said receive pulse modulator to receive pulse modulated receive data and couple said pulse modulated receive data across said isolation boundary; and
   f) a receive integrator coupled to said user side of said receive digital coupler to generate an approximation in analog form of said line-side receive data.

14. The isolation circuit as recited in claim 13, wherein said transmit and said receive pulse modulators are pulsewidth modulators.

15. The isolation circuit as recited in claim 13, wherein said transmit and said receive pulse modulators are pulse position modulators.

16. The isolation circuit as recited in claim 13, wherein said communication network is a telephone network.

17. The isolation circuit as recited in claim 13, wherein said transmit and said receive digital couplers are optical couplers forming said isolation boundary between an LED emitter and a photodiode receptor.

18. The isolation circuit as recited in claim 17, wherein said optical couplers operate in the saturation region when activated.

19. An isolation circuit in a data access arrangement for transmitting data across an isolation boundary separating a first side and a second side, comprising:
   a) a pulse modulator on said first side to receive transmit data for pulse modulating transmit data in an analog waveform;
   b) a digital coupler having a first and a second side, said first side operably coupled to said pulse modulator to receive pulse modulated data and couple said pulse modulated transmit data across said isolation boundary; and
   c) an integrator coupled to said second side of said digital coupler to generate an approximation in analog form of said transmit data.

20. The isolation circuit as recited in claim 19, wherein said pulse modulator is a pulsewidth modulator.

21. The isolation circuit as recited in claim 19, wherein said pulse modulator is a pulse position modulator.

22. The isolation circuit as recited in claim 19, wherein said digital coupler is an optical coupler.

23. A data access arrangement for isolating a user device on a user side of an isolation boundary from a telephone network on a line-side of said isolation boundary, comprising:
   a) a transmit isolation circuit comprising a transmit pulse modulator on said user side to receive user side transmit data in an analog waveform, a transmit digital coupler having a user side and a line-side, said user side operably coupled to said transmit pulse modulator to receive pulse modulated transmit data and to couple said pulse modulated transmit data across said isolation boundary, and a transmit integrator coupled to said line-side of said transmit digital coupler to generate an approximation in analog form of said user side transmit data;
   b) a receive isolation circuit comprising a receive pulse modulator on said line-side to receive line-side receive data in an analog waveform, a receive digital coupler having a line-side and a user side, said line-side operably coupled to said receive pulse modulator to receive pulse modulated receive data and couple said pulse modulated receive data across said isolation boundary, and a receive integrator coupled to said user side of said receive digital coupler to generate an approximation in analog form of said line-side receive data; and
   c) a hybrid circuit coupled between said transmit and said receive isolation circuits on said line-side to combine said approximation of said transmit data and said receive data onto a line pair providing full duplex operation to said telephone network, said hybrid circuit also to mitigate the presence of said transmit data on said receive data as perceived on said user side.

24. The data access arrangement as recited in claim 23, further comprising a diode bridge coupled to said line pair of said hybrid circuit to form tip and ring signals for said telephone network.

* * * * *

UNITED STATES PATENT AND TRADEMARK OFFICE
CERTIFICATE OF CORRECTION

PATENT NO. : 5,991,335
DATED : November 23, 1999
INVENTOR(S) : Tim Urry Price

It is certified that error appears in the above-identified patent and that said Letters Patent is hereby corrected as shown below:

Column 1,
Line 62, change "uswer" to --user--

Column 3,
Line 34, after "transformation" change "device" to --devices--

Column 4,
Line 23, after "diode" insert --and--

Column 5,
Line 39, after "with" delete "s"

Column 7,
Line 2, after "are" change "know" to --known--
Line 45, after "current" change "sync" to --sink--

Column 8,
Line 55, after "into" change "pulse" to --hold--

Signed and Sealed this

Thirty-first Day of July, 2001

*Attest:*

NICHOLAS P. GODICI
*Attesting Officer*    *Acting Director of the United States Patent and Trademark Office*